United States Patent Office 2,961,595
Patented Nov. 22, 1960

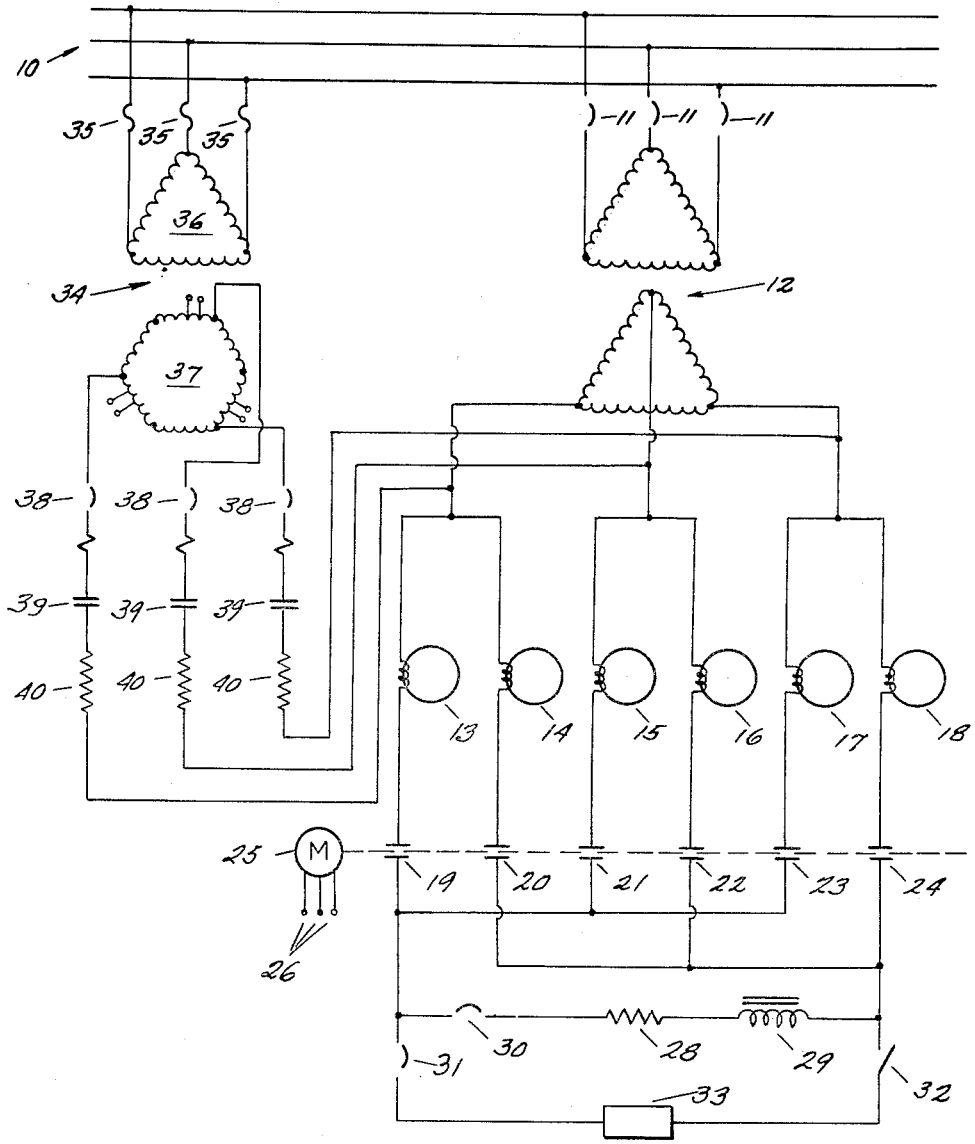

2,961,595

STARTING CIRCUIT FOR MECHANICAL RECTIFIERS USING PHASE SHIFTING MEANS

Walter V. Chumakov, Philadelphia, Pa., assignor to I-T-E Circuit Breaker Company, Philadelphia, Pa., a corporation of Pennsylvania Filed Nov. 21, 1958, Ser. No. 775,456

14 Claims. (Cl. 321—48)

This invention relates to a starting circuit for mechanical rectifiers, and more specifically relates to an improvement over the starting circuit set forth in U.S. Patent No. 2,782,360, entitled "Starting Circuit for Mechanical Rectifiers," in the name of John A. Kuzmack.

As may be seen by reference to the above noted U.S. Patent No. 2,782,360, mechanical rectifiers require a starting circuit to accomplish the following functions:

(1) Proper commutation is to be achieved before the main rectifier power transformer is connected to the main A.-C. source so that the rectifier contacts are separated within the protective step provided by their respective commutating reactors. Furthermore, a certain amount of safety should be provided to allow for voltage variations, voltage dips, mechanical inaccuracies of the contact mechanism, base load changes, etc.

(2) The so-called base load current must be above the minimum magnetizing current of the commutating reactors for the creation of a sufficient protective step within which the reactors may operate without allowing the various excitation circuits, such as pre-excitation, from reversing the commutating reactor flux before the step is required.

(3) The main rectifier transformer and other inductive equipment in the main line is to be sufficiently magnetized so that excessive inrush currents are avoided when the main A.-C. protective equipment connects the various inductive equipment and the rectifier to the main A.-C. source.

(4) The A.-C. voltage difference between the line and load side of the main A.-C. breaker terminals prior to closing the breaker, or after tripping it, should be maintained within prescribed limits.

(5) The starting stage fault current due to a possible backfire should be limited to a value which can be safely interrupted by the rectifier contacts without excessive damage.

(6) Magnetizing inrush currents should be limited to reasonable values so as to permit successful starting with relatively small circuit components.

(7) Circulating currents appearing in the starting circuit when the main A.-C. breaker and starting circuit switching means are closed so as to interconnect their two A.-C. sources should not exceed some predetermined magnitude so as to pull down or increase the auxiliary A.-C. source voltage and thus affect the equipment.

Patent No. 2,782,360 provides an auxiliary starting circuit which is directly connected to the secondary side of the main rectifier transformer and includes an auxiliary voltage source which may be connected to the main transformer secondary prior to energization of the primary winding of the main transformer. Included in series with this auxiliary voltage source are contactor means which selectively adds and decreases resistance in the circuit from the auxiliary transformer to the main transformer secondary.

To comply with the requirement of items 5 through 7 listed above, the circuit has a relatively high resistance which is sequentially decreased after the auxiliary voltage source is initially connected and transients have died down to a lower, and finally a zero resistance in order to comply with the requirements listed in items 1 through 4. Therefore, when the auxiliary voltage source is finally connected, it will apply a voltage to the rectifier transformer output which is approximately equal in phase and magnitude to the normal operating voltage of the main A.-C. source.

It will be noted from the above that it would be extremely desirable to eliminate the short circuiting stage of the auxiliary voltage source, since this stage would permit excessive fault currents to flow, in the event that there is a backfire prior to connection of the main A.-C. source. Furthermore, the wiring and circuit components must be relatively large, because of this relatively large short circuit current which would be limited only by the impedance of the auxiliary voltage source transformer.

A further drawback in the above noted type of starting circuit is that the auxiliary voltage source is energized in phase with the main voltage source. The result of this type of connection with series impedances is that the voltage applied to the rectifier transformer secondary output is phase shifted from the voltage which will appear when the main A.-C. breakers are closed to directly energize the main rectifier transformer.

This phase shift comes about because the auxiliary voltage necessarily drives a magnetizing current component of the main transformer and of the other inductive equipment in the main line, such as induction regulators. Accordingly, the voltage drop across the various resistors of the auxiliary starting circuit is phase shifted so that the net voltage applied to the main transformer from the auxiliary source is phase shifted from the common voltage source. In view of this phase shift and different magnitude of starting voltage, the point at which the contacts break within their commutating reactor step will be shifted, with respect to the step, when the rectifier is driven from its main source. Therefore, it is possible that the contact will operate before the step begins, or after the step is ended. In either case, a very heavy backfire will probably occur.

The principle of my invention is to phase shift the auxiliary voltage source so that the voltage applied to the main rectifier secondary circuit will be substantially in phase with the voltage which will appear at the output of the rectifier secondary when the main rectifier transformer is directly energized through its main A.-C. breakers. Accordingly, the voltage of the auxiliary voltage source will be a direct imitation of the voltage (in phase) which is to appear on the main transformer secondary so that the conditions at the time the main A.-C. breaker is closed and at starting or shut down will allow proper commutation and safe contact breaking within its commutating reactor protective step.

Furthermore, when using such a phase shifted voltage source for the auxiliary circuit, only a single stage may be necessary for the starting circuit, as contrasted to the multiple stages required in the device of Patent No. 2,782,360, where the auxiliary voltage source is energized in phase with the main voltage source.

Some unexpected results of this invention not stated above are:

a. Flexibility in design of the starting and shutdown circuit. Since the short-circuiting stage is eliminated, it is not necessary to match the magnitudes of starting voltage applied to rectifier transformer secondary and the normal voltage appearing across same terminals when the main breaker closes. The designer could select the best auxiliary transformer voltage to satisfy the requirements for successful starting and specify circuit impedances and phase shift amount to suit the application. The circuit could be designed to use most economical components and to start or shut-down the unit at any tap of the rectifier transformer or position of the main primary step-or-induction voltage regulators.

b. Possibility of using standard voltages of the auxiliary source. In view of foregoing, it is possible to use standard voltage outputs of auxiliary or control transformers, such as 115 v., 230 v., 460 v., to start or shut-down the rectifier unit even if the secondary voltage of the rectifier transformer is not standard. If the phase shift of this auxiliary source is correct, no additional transformers will be necessary. Otherwise, a 1:1 voltage ratio phase shift device could be added to obtain the required phase shift.

c. Universal use for starting and shut-down purposes. The circuit is not a starting circuit only. It is also used to reduce transients and obtain arc-free operation of the rectifier during the shut-down. In normal operation the circuit is disconnected. Before shut-down the circuit may be automatically reconnected, the A.-C. main breaker opened, and then the starting stages disconnected in reverse sequence. The same technique could be used on semi-conductor installations as contrasted to contact rectifiers to reduce voltage transients and peaks present due to inductive components in the unit.

d. Reduced interrupting duty of the main A.-C. breaker and shorter clearing time. When the circuit is connected a voltage will be induced in the primary of the main rectifier transformer and, hence, will appear on secondary terminals of the main breaker. Normally, the A.-C. breakers require several cycles to interrupt the current. The interruption is usually complete when the contacts are sufficiently separated to eliminate restrike of an arc. With the instant invention, the voltage determining the interruption and clearing time is the difference between primary A.-C. line voltage and the induced voltage at breaker output terminals. Since its magnitude is smaller than that of the line voltage and the current is transferred to the by-pass circuit as discussed, certain relief in main A.-C. breaker interrupting duty is obtained with reduced interrupting time at given design and velocity of the contact separation. A similar circuit could be used as direct by-pass across main A.-C. breaker to start and shut-down the unit from the primary side.

Accordingly, a primary object of my invention is to provide a novel starting circuit for mechanical rectifiers in which the auxiliary voltage applied to the main rectifier transformer will be substantially in phase with the voltage to appear on the main rectifier transformer when its A.-C. breakers are closed.

Another object of this invention is to provide a novel starting circuit for mechanical rectifiers which utilizes a minimum number of components which need carry only relatively small currents under short circuit and circulating current conditions.

A further object of my invention is to provide a single stage for a mechanical rectifier starting and shut-down circuit having a relatively high resistance, and being energized from a source of voltage which is phase shifted from the voltage to be connected to the main rectifier transformer.

These and other objects of my invention will become apparent from the following description when taken in conjunction with the figure in which my novel starting circuit is illustrated for a three-phase double way mechanical rectifier.

It is to be noted that this type of connection is purely arbitrary, and my novel starting circuit has universal application to all types of mechanical rectifier circuits.

In the figure, A.-C. power line 10 supplies power to the mechanical rectifier through circuit breakers 11 and main power transformer 12. The secondary of main power transformer 12 is connected to six commutating reactors, 13 through 18, which are in turn connected to contacts 19 through 24 respectively.

Contacts 19 through 24 are synchronously driven into and out of engagement by a synchronous motor, schematically shown by motor 25, which is energized at terminals 26. Details of the manner in which motor 25 drives contacts 19 through 24 are more fully described in U.S. Patent No. 2,759,141, in the name of Edward J. Diebold, entitled "Regulator for Mechanical Rectifiers," and assigned to the assignee of the instant invention.

In order that the contacts 19 through 24 be properly synchronized in their operation with respect to their commutating reactors 13 through 18 respectively, a base load circuit including resistor 28, reactor 29 and circuit breaker 30 is provided. The circuit breaker 30 is closed before the main D.-C. breaker 31 and disconnect switch 32 are closed to energize the main rectifier load 33. Thus, when the base load circuit is connected to the output of the rectifier, the rectifier output current is limited by the impedance of resistor 28, so that a relatively small current will be drawn through the various contacts 19 through 24, in the event that the protective step of their respective commutating reactor is not provided for the first few cycles of operation. Once the contact operation is synchronized with respect to their respective commutating reactors, however, and the rectifier is energized from its main A.-C. source, the main load 33 will be connected to the circuit, and the base load disconnected.

In order to allow starting of the rectifier circuit without the relatively severe transient conditions that would be present if the main A.-C. breaker 11 is closed without any other steps being taken, I have provided an auxiliary starting circuit which includes the auxiliary transformer 34 which is energized from the main power line 10 through fuse protective means 35.

The auxiliary voltage transformer includes a delta-connected primary winding 36 and a polygon-connected secondary winding 37 which is of the phase shifting type. That is to say, depending upon the point at which the secondary lines are connected to the transformer secondary will determine the degree of phase shift of the secondary voltage from the main input voltage. Secondary winding 37 is then connected through the multi-phase circuit breaker 38 and in series with contacts 39 which are movable between relatively engaged and disengaged positions, current limiting resistors 40, and the secondary connection is terminated at the respective phase of the main secondary winding of main transformer 12.

In operation, before the main A.-C. breaker 11 is closed, the rectifier is started by first closing the base load circuit breaker 30, circuit breaker 38 and contactor 39 of the auxiliary voltage transformer 34. Accordingly, a current will be drawn from secondary winding 37 in series with current limiting resistors 40 so as to supply the magnetizing current of main transformer 12, and of any other inductive equipment connected in the main circuit.

Similarly, current is supplied to the base load circuit so as to drive the flux of reactors 13 through 18 in a manner to synchronize them with the synchronous operation of their respective contacts 19 through 24 respectively.

It will be assumed here that the terminals 26 of motor 25 are energized from the main power source 10. By causing the auxiliary voltage from source 37 to be phase shifted from the voltage in the main source, the voltage ultimately applied to the secondary of main transformer 12 will be substantially in phase with the voltage of main source 10 because of the phase shift induced by the flow of the component of magnetizing current of the main transformer through resistors 40. Hence, when the main A.-C. breakers 11 are subsequently closed, the voltage applied to the rectifier secondary will be substantially identical to the previous auxiliary voltage which was used for synchronizing the commutating reactors with the contacts driven from synchronous motor 25 which, in turn, is energized from the main source. Accordingly, when the main rectifier transformer is energized, the point at which the contacts 19 through 24 operate in their steps, and the position of the step itself, will not be altered.

In the event that the starting is not successful, and a backfire occurs after closing contactors 39, the backfire current will be substantially limited, because the resistors 40 are in the circuit and because of the impedance of the auxiliary transformer 34. Therefore, the fault capacity of the starting circuit is substantially decreased over the type of starting circuit which utilizes a final short circuiting stage and no phase shift of the auxiliary voltage source.

If the starting process is successful, then it is clear that the main A.-C. breakers 11 may be closed without causing excessive transient currents in the rectifier circuit, since a major portion of its transformer magnetizing current is being supplied from the auxiliary transformer 34.

While the preferred embodiment of my invention, as illustrated in the figure, shows a single closing stage in conjunction with a two winding phase-shifting transformer, it will be apparent to those skilled in the art that many modifications may be made while still coming within the scope of my invention.

By way of example, the transformer 34 could have been shown as an auto-transformer, rather than a two winding transformer, and in a similar manner, the transformer could have adjustable taps so that the phase shift of the voltage may be adjusted as required. Similarly, the phase shift could have been caused by using a rotary type phase shifter or by the connection of inductances in the primary or secondary circuit. Furthermore, a plurality of starting stages could have been utilized wherein each of the stages is provided with a respective phase shifted input voltage, or the phase shifted input voltage could be utilized only in conjunction with the final starting stage.

Essentially, it is seen that by phase shifting the input voltage of the starting stage, I can now eliminate the zero impedance stage, substantially decrease the components required in the starting circuit in both number and rating; and when the main rectifier is eventually connected to the main line, the voltage applied by the main voltage source will be indentical, or substantially identical, in phase, to the auxiliary voltage which drives the rectifier under starting conditions.

Although I have described preferred embodiments of my novel invention, many variations and modifications will now be obvious to those skilled in the art, and I prefer therefore to be limited not by the specific disclosure herein but only by the appended claims.

I claim:

1. A starting circuit for a mechanical rectifier; said mechanical rectifier comprising a main power transformer energizable from a main A.-C. source; said mechanical rectifier including a pair of cooperating contacts and a commutating reactor connected in series therewith; said pair of cooperating contacts being synchronously driven into and out of engagement with respect to one another to synchronously connect and disconnect said main power transformer to a D.-C. load; said starting circuit comprising an auxiliary transformer, phase shifting means, an impedance and a contacting means; said auxiliary transformer being energized from said main A.-C. source; said auxiliary transformer being connected to said phase shifting means to have the output voltage of said auxiliary transformer controlled with respect to the voltage of said main A.-C. source; said phase shifted output of said auxiliary transformer being connected to the output of said main power transformer through said impedance and said contacting means; said contacting means being closed prior to energization of said main transformer to pre-energize said main transformer and said commutating reactor.

2. A starting circuit for a mechanical rectifier; said mechanical rectifier comprising a main power transformer energizable from a main A.-C. source; said mechanical rectifier including a pair of cooperating contacts and a commutating reactor connected in series therewith; said pair of cooperating contacts being synchronously driven into and out of engagement with respect to one another to synchronously connect and disconnect said main power transformer to a D.-C. load; said starting circuit comprising an auxiliary transformer, phase shifting means, an impedance and a contacting means; said auxiliary transformer being energized from said main A.-C. source; said auxiliary transformer being connected to said phase shifting means to have the output voltage of said auxiliary transformer controlled with respect to the voltage of said main A.-C. source; said phase shifted output of said auxiliary transformer being connected to the output of said main power transformer through said impedance and said contacting means; said contacting means being closed prior to energization of said main transformer to pre-energize said main transformer and said commutating reactor; voltage applied to said main power transformer output from said starting circuit being substantially in phase with the output of said main power transformer when driven by said main A.-C. source.

3. A starting circuit for a mechanical rectifier; said mechanical rectifier comprising a main power transformer energizable from a main A.-C. source; said mechanical rectifier including a pair of cooperating contacts and a commutating reactor connected in series therewith; said pair of cooperating contacts being synchronously driven into and out of engagement with respect to one another to synchronously connect and disconnect said main power transformer to a D.-C. load; said starting circuit comprising a phase shifting transformer, an impedance, and a contacting means; said phase shifting transformer being energized from said main A.-C. source; the output of said phase shifting transformer being connected to the output of said main power transformer through said impedance means and said contactor.

4. A starting circuit for a mechanical rectifier; said mechanical rectifier comprising a main power transformer energizable from a main A.-C. source; said mechanical rectifier including a pair of cooperating contacts and a commutating reactor connected in series therewith; said pair of cooperating contacts being synchronously driven into and out of engagement with respect to one another to synchronously connect and disconnect said main power transformer to a D.-C. load; said starting circuit comprising a phase shifting transformer, an impedance, and a contacting means; said phase shifting transformer being energized from said main A.-C. source; the output of said phase shifting transformer being connected to the output of said main power transformer through said impedance means and said contactor; the voltage applied to said output of said main power transformer being substantially in phase with the output of said main power transformer when driven by said main A.-C. source.

5. In a multiphase mechanical converter for exchanging energy between a main A.-C. system and a D.-C. system; said mechanical converter comprising the series connection of a pair of cooperable contacts and a commutating reactor for each phase; each of said pairs of cooperable contacts being synchronously operated into and out of engagement with one another; a main power transformer; said main power transformer being connected between said mechanical converter and said main A.-C. system; a starting circuit for energizing said mechanical converter and said main power transformer prior to connection between said power transformer and said A.-C. system; said starting circuit including an A.-C. voltage source derived from said A.-C. system, means for phase shifting the output voltage of said voltage source, an impedance, and a contactor means; said output voltage of said voltage source being connected to said main power transformer through circuit means including said impedance and said contacting means; said contactor means being closable prior to connection between said main A.-C. system and said main power transformer.

6. In a multiphase mechanical converter for exchanging energy between a main A.-C. system and a D.-C. system; said mechanical converter comprising the series connection of a pair of cooperable contacts and a commutating reactor for each phase; each of said pairs of cooperable contacts being synchronously operated into and out of engagement with one another; a main power transformer; said main power transformer being connected between said mechanical converter and said main A.-C. system; a starting circuit for energizing said mechanical converter and said main power transformer prior to connection between said power transformer and said A.-C. system; said starting circuit including an A.-C. voltage source derived from said A.-C. system, means for phase shifting the output voltage of said voltage source, an impedance, and a contactor means; said output voltage of said voltage source being connected to said main power transformer through circuit means including said impedance and said contacting means; said contactor means being closable prior to connection between said main A.-C. system and said main power transformer; the voltage applied to said main power transformer by said starting circuit being phase shifted by said phase shifting means to be substantially in phase with the voltage of said main power transformer when said main power transformer is connected to said A.-C. system.

7. In a multiphase mechanical converter for exchanging energy between a main A.-C. system and a D.-C. system; said mechanical converter comprising the series connection of a pair of cooperable contacts and a commutating reactor for each phase; each of said pairs of cooperable contacts being synchronously operated into and out of engagement with one another; a main power transformer; said main power transformer being connected between said mechanical converter and said main A.-C. system; a starting circuit for energizing said mechanical converter and said main power transformer prior to connection between said power transformer and said A.-C. system; said starting circuit including an A.-C. voltage source derived from said A.-C. system, means for phase shifting the output voltage of said voltage source, an impedance, and a contactor means; said output voltage of said voltage source being connected to said main power transformer through circuit means including said impedance and said contacting means; said contactor means being closable prior to connection between said main A.-C. system and said main power transformer; the voltage applied to said main power transformer by said starting circuit being phase shifted by said phase shifting means to be substantially in phase with the voltage of said main power transformer when said main power transformer is connected to said A.-C. system; said starting circuit A.-C. voltage source and said starting circuit phase shifting means comprising a phase shifting transformer.

8. In a mechanical rectifier energizing a D.-C. load from an A.-C. source; a first and a second transformer having primary and secondary windings; commutating reactors and cooperating contacts; said first and second transformer primary windings connectible to said A.-C. source; each of said first transformer secondary windings forming a closed series connection with one of said commutating reactors, one of said cooperating contacts and said D.-C. load; each of said second transformer secondary windings connected to energize said first transformer secondary winding before said first transformer primary winding is connected to said A.-C. source and forming a closed series connection with one of said commutating reactors, cooperating contacts, said D.-C. load and a variable impedance; said second transformer being a phase shifting transformer.

9. In a mechanical rectifier energizing a D.-C. load from an A.-C. source; a first and a second transformer having primary and secondary windings; commutating reactors and cooperating contacts; said first and second transformer primary windings connectible to said A.-C. source; each of said first transformer secondary windings forming a closed series connection with one of said commutating reactors, one of said cooperating contacts and said D.-C. load; each of said second transformer secondary windings connected to energize said first transformer secondary winding before said first transformer primary winding is connected to said A.-C. source and forming a closed series connection with one of said commutating reactors, cooperating contacts, said D.-C. load and a parallel connection of a plurality of series connected resistors and switches; said second transformer being a phase shifting transformer.

10. In a mechanical rectifier energizing a D.-C. load from an A.-C. source; a first and a second transformer having primary and secondary windings; commutating reactors and cooperating contacts; said first and second transformer primary windings connectible to said A.-C. source; each of said first transformer secondary windings forming a closed series connection with one of said commutating reactors, one of said cooperating contacts and said D.-C. load; each of said second transformer secondary windings connected to energize said first transformer secondary windings before said first transformer primary winding is connected to said A.-C. source and forming a closed series connection with one of said commutating reactors, cooperating contacts, said D.-C. load and a variable impedance; said second transformer constructed to have a lower short circuit current than said first transformer; said second transformer being a phase shifting transformer.

11. In a starting circuit for a mechanical rectifier, said mechanical rectifier having a multiphase main power transformer, said multiphase main power transformer having a primary and a secondary winding; an auxiliary transformer having a primary and a secondary winding; each phase of said auxiliary transformer secondary being connected in series with a variable impedance and the corresponding phase of said main power transformer secondary winding; said primary windings of said auxiliary transformer being connected to an A.-C. source before said primary windings of said main transformer are connected to said A.-C. source, to thereby premagnetize said main transformer and substantially eliminate starting transients therein; said auxiliary transformer having phase shifting means associated therewith for phase shifting the voltage of its said secondary winding with respect to the voltage of said A.-C. source.

12. In a starting circuit for a mechanical rectifier, said mechanical rectifier having a multiphase main power transformer, said multiphase main power transformer having a primary and a secondary winding; an auxiliary transformer having a primary and a secondary winding; said auxiliary transformer constructed to have a lower short circuit current than that of said main transformer; each phase of said auxiliary secondary transformer being connected in series with a variable impedance and the corresponding phase of said main power transformer secondary winding; said primary windings of said auxiliary transformer being connected to an A.-C. source before said primary windings of said main transformer are connected to said A.C. source, to thereby premagnetize said main transformer and substantially eliminate starting transients therein; said auxiliary transformer having phase shifting means associated therewith for phase shifting the voltage of its said secondary winding with respect to the voltage of said A.-C. source.

13. In shut down circuit for a rectifier; said rectifier comprising a main power transformer energizable from a main A.-C. source; said rectifier including a rectifier element and a saturable type reactor connected in series therewith; said starting circuit comprising a phase shifting transformer, an impedance, and a contacting means; said phase shifting transformer being energized from said main A.-C. source; the output of said phase shifting transformer being connected to the output of said main power transformer through said impedance means and said contactor; the voltage applied to said output of said main power transformer being substantially in phase with the output of said main power transformer when driven by said main A.-C. source.

14. A starting and shut down circuit for a rectifier; said rectifier being energized from a main power transformer; said starting circuit comprising an auxiliary voltage source having phase shifting means therefor, an impedance, and a contacting means; said auxiliary voltage source, being energized from the A.-C. source for said main power transformer; said auxiliary voltage source being connected in series with said impedance, said contacting means, and the output of said main power transformer; the voltage applied to the output of said main power transformer being substantially in phase with the output of said main power transformer when driven by said A.-C. source.

References Cited in the file of this patent

UNITED STATES PATENTS

| | | |
|---|---|---|
| 2,261,685 | Jordan | Nov. 4, 1941 |
| 2,782,360 | Kuzmack | Feb. 19, 1957 |